United States Patent [19]

Kalvaitis et al.

[11] Patent Number: 4,791,530
[45] Date of Patent: Dec. 13, 1988

[54] INSULATING BARRIER SYSTEM FOR SWITCHGEAR

[75] Inventors: Arvydas J. Kalvaitis, Northbrook; John W. Estey, Glenview, both of Ill.

[73] Assignee: S&C Electric Company, Chicago, Ill.

[21] Appl. No.: 91,624

[22] Filed: Sep. 1, 1987

[51] Int. Cl.$^4$ ................................................ H02B 1/00
[52] U.S. Cl. .................................... 361/331; 361/335; 361/347; 200/50 AA; 200/144 R
[58] Field of Search ......................... 200/50 AA, 50 C; 361/331, 335, 336, 337, 338, 339, 342, 343–345, 347

[56] References Cited

U.S. PATENT DOCUMENTS 4,071,722  1/1978  Hart .................................. 200/339 X
4,689,716  8/1987  Cooper et al. ....................... 361/331

OTHER PUBLICATIONS

S&C Descriptive Bulletin 662-30 (p. 14), dated Sep. 8, 1986, entitled "S&C Manual PMH and PMS Pad--Mounted Gear".
S&C Instruction Sheet 662-505 (pp. 5,7), dated Mar. 26, 1984.
S&C Descriptive Bulletin 834-30 (pp. 8, 12a, and 13) dated Nov. 19, 1973.
*Transmission & Distribution* (p. 17), Jul. 1976 (related to Electrical Equipment Inc. three-phase removable barrier system).

*Primary Examiner*—J. R. Scott
*Attorney, Agent, or Firm*—James V. Lapacek

[57] ABSTRACT

A barrier system is provided for electrical switchgear having an enclosure and one or more access openings. The barrier system comprises a plurality of barriers, each of which is a generally planar member. The barrier system further includes manually operable provisions for releasably securing each barrier in respective predetermined positions, and a guide and support member carried by the enclosure and engaged by the lower edge of the rear portion of each barrier during insertion and also when the barriers are in a predetermined inserted operating position. The guide and support member directs the barrier into the appropriate position when the barrier is within a predetermined range of position with respect to the guide and support member. In a specific embodiment, the manually operable provisions include a fastening device which is retained by the barrier and a cooperating receptacle retained by the enclosure. The fastening device is preferably is a fractional-turn wing-head stud. Additionally, the guide and support member in a specific embodiment includes a tapered guide surface narrowing to a receiving slot for each of the removable barriers.

27 Claims, 4 Drawing Sheets

INSULATING BARRIER SYSTEM FOR SWITCHGEAR

BACKGROUND OF THE INVENTION

1. Field of the Invention

The present invention relates generally to electrical switchgear and more particularly to an insulating barrier system for switchgear; the barrier system being easily removable from and insertable into the switchgear.

2. Description of the Related Art

Various types of electrical switchgear, for example, operating in the range of 4000 to 35,000 volts, utilize barriers fabricated from insulating material that are positioned between the components of adjacent electrical phases. These barriers, which are referred to as interphase barriers and end barriers, provide desired insulation between energized parts of different phases and between energized parts and ground. The barriers also provide physical separation and isolation between phases and between energized parts and ground to facilitate such operations as fuse handling.

The components mounted in the switchgear include switches and fuses. The switches and fuses include circuit connection points which are required to be connected to underground cables or wires using various forms of cable terminations. To accomplish the cable terminations at the connection points, the cables coming from below the switchgear enclosure are manipulated to enter the open bottom of the enclosure and are routed for termination to the connection points of the components.

With the barriers fixed in place, it is difficult in the space between the barriers to prepare the cables for connection to the switchgear as this entails stripping insulation from the cables, installing connectors, and installing the terminators. It is also relatively difficult to provide optimum placement and orientation of the cables to take account of electrical considerations for the prevention of tracking and for maintaining the dielectric properties and withstand voltage of the switchgear. Removal of the barriers aids the efficiency of preparing the cables for connection, and also permits more desirable placement and orientation of the cables with respect to the components and barriers.

Additionally, it is often desirable to remove the barriers to perform cleaning of the components of the switchgear. When the switchgear is cleaned while deenergized, the procedures typically require removal of the barriers to give access to the components. For energized cleaning, an insulated wand is utilized to spray small particles and the barriers generally do not inhibit the cleaning procedures. However, in some cases, it still may be considered desirable to remove the barriers to permit greater accessibility of the wand to the components during such energized cleaning.

Thus, it is desirable to remove the barriers when performing the cable terminations and when cleaning the switchgear. However, many types of commercially available switchgear, for example, as shown in S&C Electric Company Descriptive Bulletin 662-30 issued on Sept. 8, 1986, utilize barriers that are fastened and/or clamped at one or more locations to the switchgear enclosure or to members attached to the enclosure. For example, each of the interphase barriers is bolted at the upper front portion, is clamped at the lower rear portion, and in some cases is also clamped at the upper rear portion. Removal of these barriers entails the relatively time-consuming disassembly of the hardware that retains the barriers. There is also the possibility of losing the hardware while the work in the gear is being performed and before the barriers are reassembled into the switchgear. Additionally, the barriers are relatively difficult to reinsert and assemble into the switchgear since the worker must either reach into the gear about three feet to assemble a clamp or other fasteners, or very accurately guide the barriers into a guide or a clamp. Of course, this cannot be safely accomplished with the switchgear energized. The possibility also exists of incorrectly positioning the barriers in the switchgear, which can reduce the stability of the barriers and the withstand voltage of the switchgear and may even encourage tracking across the barrier. For example, the barrier may be incorrectly positioned such that it contacts a cable or an energized component.

Another type of switchgear, available from Electrical Equipment Inc., Birmingham, Ala., utilizes a three-phase removable barrier system including two interphase barriers and two end barriers which are fixedly assembled into a single assembly by tubular support members or spacers. The three-phase barrier assembly includes extending flanges. The enclosure is provided with internally extending ledges along each side of each compartment. The flanges of the barrier system rest on top of the ledges of the enclosure to support the barrier assembly. When the barrier assembly is inserted or removed from the enclosure, the flanges slide on the ledges to guide the barrier assembly, as well as support the rather considerable weight of the barrier assembly. The enclosure also includes a horizontal guide member located at the lower rear of each compartment. Upon insertion of the barrier assembly, the barriers engage the receiving notches of the guide member. While this removable barrier assembly may avoid the removal and loss of hardware when the barriers are removed and prevent improper positioning of the barriers in the switchgear, the insertion or removal of the barrier assembly is difficult to perform by one individual due to the rather considerable weight and volume of the barrier. For example, the dimensions of the barrier assembly approximate a cube three feet on a side. Additionally the barrier assembly is subject to damage and/or distortion during handling and during the time it is outside the switchgear. For example, any distortion of a barrier with respect to the overall assembly may result in improper barrier positioning when the barrier assembly is inserted into the switchgear.

Thus, none of these barrier arrangements is capable of being easily removed or inserted. As a result, much valuable time is lost by personnel in attempting to make desirable cable terminations and to clean the components in the gear.

SUMMARY OF THE INVENTION

Accordingly, it is a principle object of the present invention to provide a removable barrier system for electrical switchgear that has no removable hardware, that is insertable or removable with minimum effort and without tools, and that is easily manipulated by one individual to allow cable termination and/or cleaning of the components without the presence of the barriers.

It is another object of the present invention to provide a removable barrier system for electrical switchgear that allows individual barriers to be removed and that provides guidance and support for the barriers during insertion, removal, and normal operation of the switchgear.

These and other objects of the present invention are efficiently achieved by the provision of a barrier system for electrical switchgear having an enclosure and one or more access openings. The barrier system comprises a plurality of barriers, each of which is a generally planar member. The barrier system further includes manually operable provisions for releasably securing each barrier in respective predetermined positions, and a guide and support member carried by the enclosure and engaged by the lower edge of the rear portion of each barrier during insertion and also when the barriers are in a predetermined inserted operating position. The guide and support member directs the barrier into the appropriate position when the barrier is within a predetermined range of position with respect to the guide and support member. In a specific embodiment, the manually operable provisions include a fastening device which is retained by the barrier and a cooperating receptacle retained by the enclosure. The fastening device is preferably is a fractional-turn wing-head stud. Additionally, the guide and support member in a specific embodiment includes a tapered guide surface narrowing to a receiving slot for each of the removable barriers.

BRIEF DESCRIPTION OF THE DRAWING

The invention, both as to its organization and method of operation, together with further objects and advantages thereof, will best be understood by reference to the following specification taken in conjunction with the accompanying drawing in which like reference characters refer to like elements and in which.

DETAILED DESCRIPTION

Figure 1:
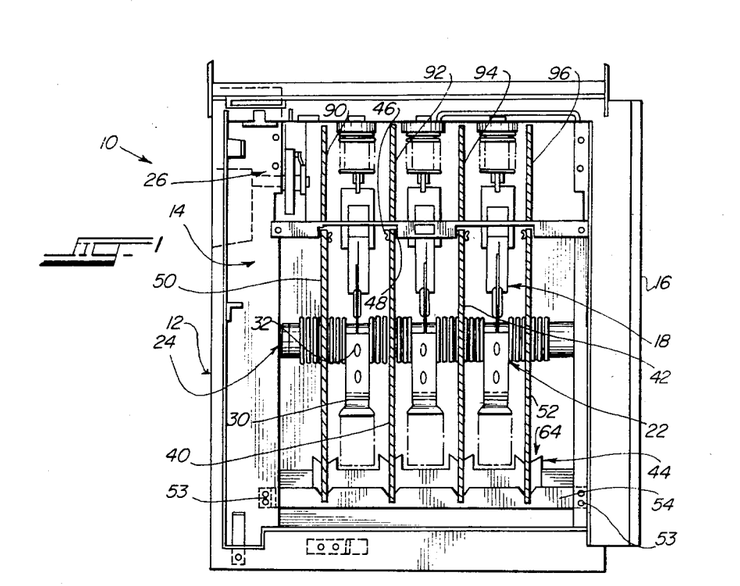
FIG. 1 is a front elevational view of electrical switchgear incorporating the barrier system of the present invention.
Figure 2:
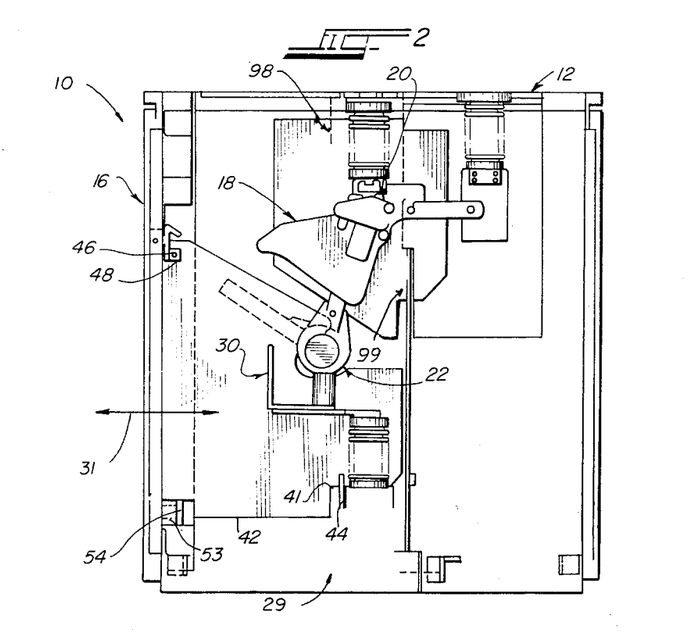
FIG. 2 is a right side elevational view with parts cut away of the electrical switchgear of FIG. 1.
Figures 3, 7, 8:
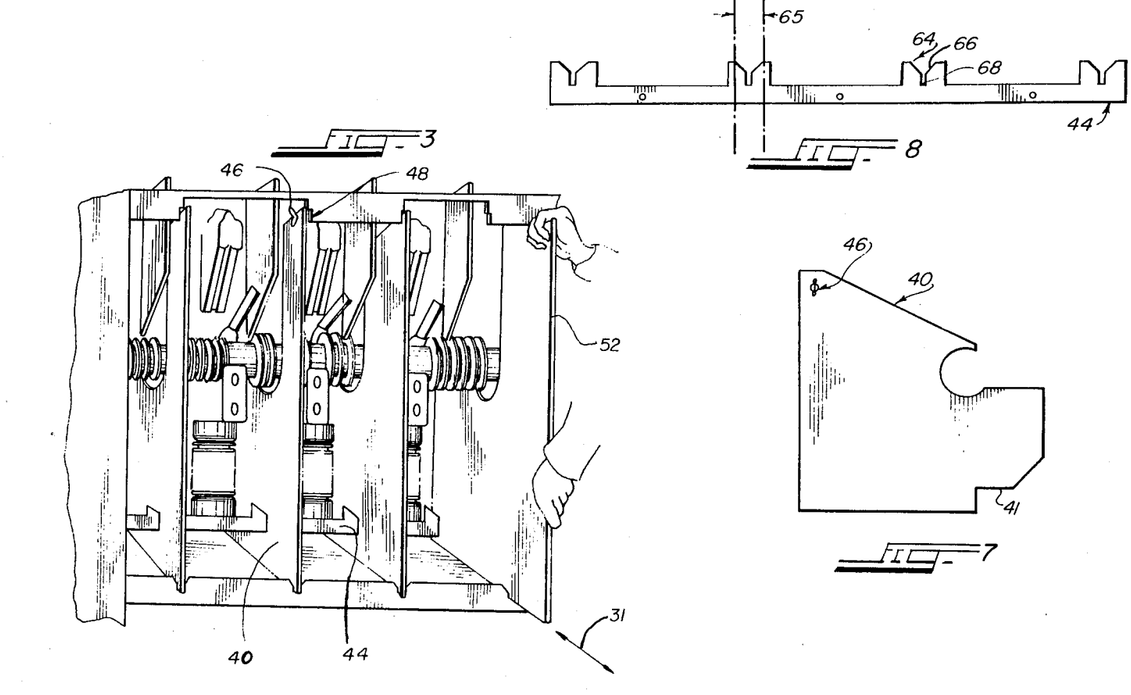
FIG. 3 is a perspective view of the electrical switchgear of FIGS. 1 and 2 illustrating the removal of a barrier.
FIG. 7 is an elevational view of a barrier of the barrier system of the present invention that is incorporated in the switchgear of FIGS. 1-5.
FIG. 8 is an enlarged elevational view of a barrier guide of the barrier system.

Referring now to FIGS. 1-3, the barrier system of the present invention is illustrated in conjunction with electrical switchgear 10 having an enclosure 12 that defines an access opening 14. A pivotally mounted door 16 is provided to cover the access opening 14 except when access to the interior of the switchgear 10 is desired. The exemplary switchgear 10 of FIGS. 1-3, referred to as pad-mounted gear, includes a three-phase switch referred to generally at 18. Each phase or pole of the switch includes a stationary contact arrangement 20 and a movable contact arrangement 22; the movable contact arrangement 22 being carried by a common operating shaft 24. The switch 18 is operable by a switch-operating mechanism referred to generally at 26. Reference may be made to U.S. Pat. No. 3,980,977 for a more detailed description of the switch 18. The electrical switchgear 10 also includes connection points, for example, terminals 30 with holes 32 for receiving cable termination connectors, as will be discussed in more detail hereinafter. The connections to a three-phase power line of the stationary contacts 20 are accomplished at the rear of the enclosure 12 by arrangements which are not pertinent to the disclosure of the present invention. While the barrier system of the present invention is illustrated herein for use with switchgear including a switch, it should also be understood that the barrier is also applicable to switchgear including fuses, etc.

In order to perform the cable terminations to connect the terminals 30 to electrical cables coming underground from underneath an open bottom portion 29 of the enclosure 12, the barrier system of the present invention is easily and quickly removable to allow access to the underground cables. The barrier system of the present invention includes two interphase barriers 40,42 and a guide and support member 44. The guide and support member 44 is carried by the enclosure 12 so as to be positioned adjacent the bottom rear portion of the barriers 40,42 with the barriers positioned in the predetermined inserted positions as shown in FIGS. 1-2. These respective inserted positions are the normal operating positions. The guide and support member 44 is arranged so as to be generally perpendicular to the planes of the barriers when the barriers are in their respective normal operating positions and also when the barriers are being inserted or removed. It should also be noted that the guide and support member 44 is also arranged so as to be generally perpendicular to the direction of insertion and removal illustrated in FIG. 2 by the direction arrows referred to at 31. The barriers 40,42 carry a manually operable fastening device generally referred to at 46. The enclosure 12 carries cooperating structure at 48 that cooperates with the fastening device 46. In the preferred emboiment, the fastening device is captively retained by the barriers to avoid loss of the fastening device when the barrier is removed from the enclosure 12.

In specific embodiments and as illustrated in the exemplary switchgear 10, the barrier system also includes end barriers 50,52. While the interphase barriers 40,42 function to separate and isolate the phases of the switch 18, the end barriers 50,52 function to isolate the switch phases from the sides of the enclosure 12 which are typically fabricated from conductive material. The switchgear in specific embodiments also includes one or more front barriers (not shown) which are well known in the art and which are positioned in front of the barriers 40,42,50,52.

With the barriers in the inserted position for normal operation as shown in FIGS. 1-2, each of the barriers, for example, barrier 40, is supported by the fastening device 46 and is additionally supported along the lower edge 41 at the rear portion by the guide and support member 44. An illustrative barrier 40 is shown in FIG. 7. Additionally, in specific embodiments and for example as defined by the size and desired rigidity of the barriers, as well as the material from which the barriers are fabricated, a front support member 54 is provided. In a specific illustrative embodiment, the barriers 40,42,50,52, the guide and support member 44, and the support member 54 are fabricated from NEMA grade GPO-3 fiberglass, 3/16 inch in thickness for the support members 44,54 and ⅛-¼ inch thickness for the barriers, dependent upon their overall dimensions which are typically 20–40 inches in height and depth.

Figure 6:
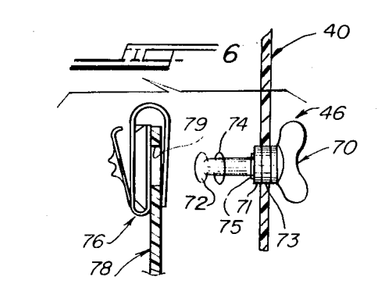
FIG. 6 is an enlarged view of portions of a barrier and the enclosure illustrating the fastener device and cooperating structure.

Referring now additionally to FIG. 3, the end barrier 52 is illustrated in a partially removed position—which is also the same as a partially inserted position. To remove any of the barriers 40,42,50, or 52, the fastening device 46 is grasped with the fingers and manually operated. In a specific embodiment as will be discussed in more detail hereinafter and as illustrated in FIG. 6, the fastening device 46 is released or fastened by rotation of approximately a quarter of a turn so as to release the barrier 40 from the enclosure at the location of the cooperating structure 48. After operation of the fastening device 46, the barrier 52 is capable of being removed as shown in FIG. 3 by means of grasping the barrier, and sliding and lifting the barrier 52 out of the enclosure 12. As shown in FIG. 3, the barrier 52 is easily removed by one person without tools and with a minimum of effort. The direction of insertion/removal of the barriers is illustrated by the direction arrows referred to at 31 in FIG. 2.

In order to efficiently terminate the cables, the interphase barriers 40,42 are removed in the same manner as discussed above in connection with the end barrier 52 in FIG. 3. While it is not necessary for the end barriers 50,52 to be removed for terminating the cables, it does render the termination and connection operations more efficient. It is also desirable to remove the end barriers 50,52 along with the interphase barriers 40,42 for the cleaning of components within the switchgear 10 after the switchgear has been de-energized. In accordance with specific operating rules, certain owners of switchgear permit the barriers to be removed by qualified personnel with the switchgear 10 energized in order to allow the cleaning of energized equipment.

If the front support member 54 is provided with the barrier system for the switchgear 10, the front support member 54 is also removed to allow more unrestricted access. The front support member 54 interfits with a slotted bracket 53 located at each side of the enclosure 12. Accordingly, for removal, the front support member 54 is lifted free of the brackets 53.

Figure 4:
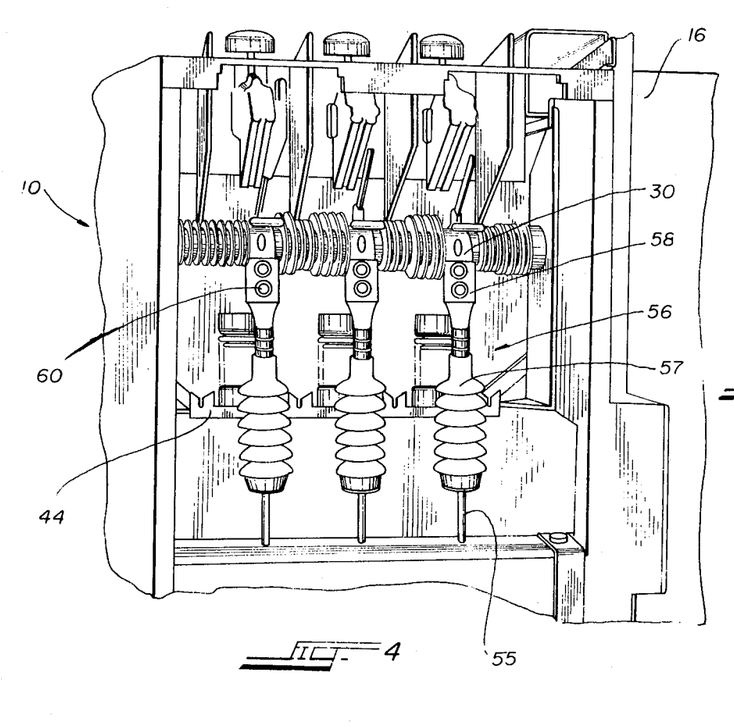
FIG. 4 is a perspective view of the electrical switchgear of FIGS. 1-3 after the removal of the barriers and after the cable terminations and connections have been accomplished.

Referring now to FIG. 4, with the barriers removed and after the switchgear 10 has been deenergized (while observing appropriate safeguards and clearance procedures), the cables 55 are terminated. In the specific illustration, the cable terminations are referred to generally at 56 including cable terminators 57 and connector tongues 58. As can be seen in FIG. 4, with the barriers removed, the worker has ample freedom of movement and working space within the enclosure. This work space permits the worker to efficiently strip insulation from the cables, install the cable terminators 57, and attach the connector tongues 58 to the cables. Additionally, the work space also permits the cables 55 to be oriented and placed in the most suitable manner to obtain the maximum withstand voltage for the switchgear. After the cables 55 have been terminated, the connector tongues 58 are affixed to the terminals 30 of the movable switch contacts 22 via fastener devices 60.

After the cable terminating or other work has been performed within the enclosure 12, the barriers 40,42,50, and 52 are replaced or inserted into the enclosure 12. Specifically, each barrier is lifted into the enclosure with the rear lower portion of the barriers (e.g., 41) engaging the guide and support member 44, which is shown in more detail in FIG. 8. The guide and support member 44 includes a guide and support arrangement 64 for each respective barrier 40,42,50, and 52. With the lower edge 41 of the rear portion of the barrier oriented to within a predetermined range of position or orientation of the respective guide and support arrangement 64 (e.g., as illustrated by the dimension 65 in FIG. 8), the guide and support arrangement 64 guides and supports the barrier during insertion, and also maintains the barrier in the appropriate orientation in the switchgear 10. Specifically and referring now to FIG. 8, each of the respective guide and support arrangements 64 of the guide and support member 44 includes an orientation surface that defines, in cross section to the barrier plane, a V-shaped groove or tapered opening 66 which tapers into a receiving slot 68. That is, the tapered opening 66 is defined in a plane generally perpendicular to the barriers in their normal operation positions and during insertion or removal. It should also be noted that the tapered opening 66 is also defined in a plane generally perpendicular to the direction arrows 31 denoting insertion/removal direction. Thus, upon insertion of a barrier into the enclosure 12, the lower edge 41 is placed within the dimension 65 of the respective guide and support arrangement 64. The edge 41 of the barrier is guided into the receiving slot 68. It should be noted that the support and guide arrangement 64 both guides and supports the barrier along the edge 41 whenever the barrier is within the predetermined range of position or orientation as illustrated by the dimension 65. This also occurs whether the barrier is stationary, sliding horizontally, or is being moved in a combination of vertical and horizontal directions; i.e., the barrier moves down the tapered opening 66 and into the receiving slot 68 as it is sliding and being inserted rearward into the enclosure 12.

In arrangements where the front support member 54 is provided, it is replaced in the enclosure 12 before the barriers 40,42,50 and 52 are inserted to aid in the guiding and supporting of the barriers during insertion thereof. The front support member 54 functions similarly to the guide and support member 44. Of course, with the provision of the front support member 54, barrier insertion and removal can be accomplished by sliding action only, with no lifting being required, except when the barrier is outside the enclosure 12.

Figure 5:
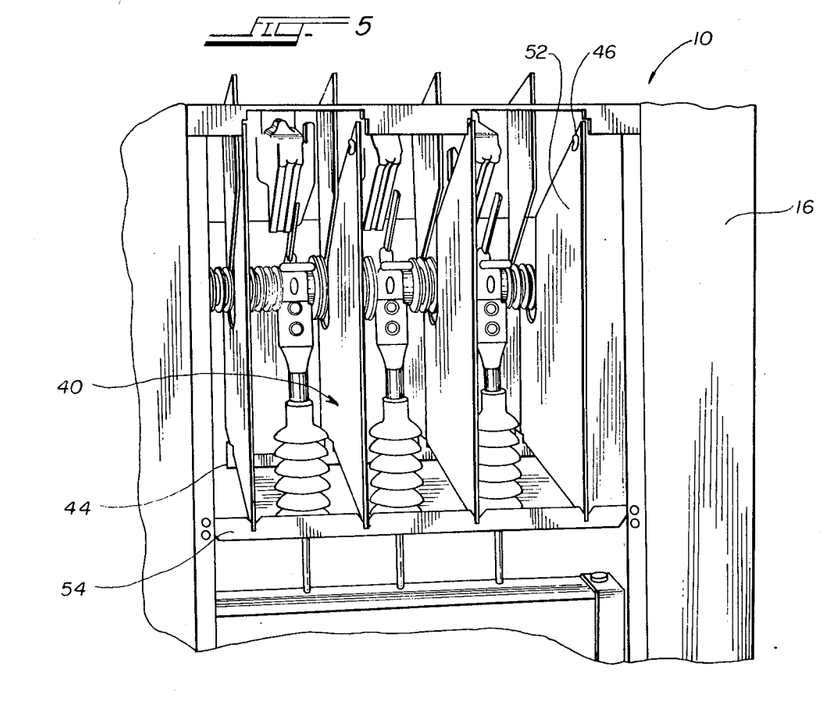
FIG. 5 is a perspective view of the electrical switchgear of FIGS. 1-4 after the barriers have been inserted.

After a barrier has been inserted to the appropriate predetermined position, the fastening device 46 is aligned with the cooperating structure 48. Then, the fastening device 46 is operated to engage the cooperating structure 48 and complete the retention of the barrier into the enclosure 12. As illustrated in FIG. 5, after the insertion of each of the barriers and operation of the fastening device 46, the switchgear is ready for operation—after following all applicable operating rules and security measures, including the closing and securing of the door 16.

Referring now additionally to FIG. 6, a specific illustrative fastening device 46 includes a wing-head stud 70 of the type that includes a planar grasping surface which is easily grasped and rotated by the fingers. The wing-head stud 70 includes a circumferential flange 74 and a swaged nose 72 which defines winged protuberances. The wing-head stud 70 passes through an aperture 73 in the respective barrier, e.g. barrier 40. A washer 71 and a pushnut 75 are assembled onto the protruding end of the wing-head stud 70 and over the circumferential flange 74, such that the pushnut 75 retains the wing-head stud 70 to the barrier 40 while still allowing rotation of the wing-head stud 70. The cooperating structure 48 of the enclosure 12 in the specific illustrative embodiment of FIG. 6 includes a clip-on receptacle 76 that is attached to a bracket or frame portion 78 extending from the enclosure 12. The frame portion 78 includes an aperture 79 to allow passage of the wing-head stud 70. The receptacle 76 is arranged to allow the stud 70 to be inserted into the receptacle 76 when the stud is in a predetermined rotational orientation. The receptacle 76 is also arranged to securely retain the wing-head stud 70 upon a fractional turn of rotation of the wing-head stud 70. The retention is achieved by the interaction of the receptacle 76 with the circumferential flange 74 and the nose 72.

In operation, after the barrier 40 has been inserted into the enclosure 12 and the fastening device 46 is aligned with the cooperating structure 48, the wing-head stud 70 is grasped by the operator, the wing-head stud is guided into the receptacle 76 and rotationally oriented to allow passage into the receptacle 76. Upon further rotation of the wing-head stud 70, the nose 72 and the circumferential flange 74 engage portions of the receptacle 76 so as to securely retain the barrier 40 in the predetermined operating position with respect to the enclosure 12.

Release of the fastening device 46 is the reverse of the fastening operation above. That is, the wing-head stud 70 is rotated until the nose 72 is released by the receptacle 76 so as to allow the withdrawal of the wing-head stud 70 from the frame portion 78 and the receptacle 76. This releases the barrier 40 from the enclosure 12 to allow removal of the barrier 40.

The exemplary switchgear 10 also includes fixed upper barriers 90,92,94, and 96 which are generally planar members and which are respectively aligned with the barriers 50,42,42 and 52. While the present invention can also be practiced with a one-piece removable barrier including, for example, the fixed upper barrier 92 and the barrier 40 such that the one-piece combinational barrier is removable, it is preferred to "split" the barrier as shown for ease of operation. In some specific embodiments where a one-piece barrier is utilized, one or more additional guides similar to the guide and support member 44 are utilized; for example, at 98,99.

Figure 9:
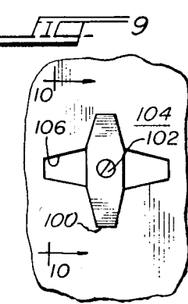
FIGS. 9 and 10 are partial front and side elevational views, respectively, for illustration of alternate fastening provisions.
Figure 10:
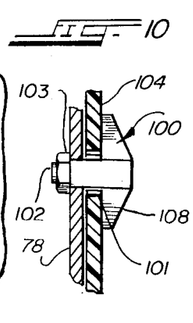

While there have been illustrated and described various embodiments of the present invention, it will be apparent that various changes and modifications will occur to those skilled in the art. For example, in alternate embodiments, the manually operable fastening device 46 is retained by the barriers. Additionally, it should be realized that other manually operable fastening provisions are used in other specific embodiments. For example, the fastening provisions of FIGS. 9 and 10 include a manually operable device 100 having a tubular portion 101 and a winged-head portion 108. The device 100 is pivotal about a bolt 102 fastened to the frame portion 78 of the enclosure 12 via a nut 103. The barrier 104 includes a suitably shaped aperture 106 to allow passage of the head 108 of the device 100 through the barrier 104. The barrier 104 is secured to the enclosure 12 by rotation of the device 100 to the position as shown in FIG. 9. It is intended in the appended claims to cover all such changes and modifications as fall within the true spirit and scope of the present invention.

What is claimed and desired to be secured by Letters Patent of the United States is:

1. A removable barrier arrangement utilized with an enclosure for electrical apparatus, the barrier arrangement comprising:
   a barrier being generally planar and being fabricated from insulating material;
   manually operable means for releasably securing said barrier when said barrier is in a predetermined operating position within said enclosure, said manually operable means comprising first means retained by said barrier and second means cooperating with said first means and being retained by said enclosure; and
   means carried by said enclosure for guiding and supporting said barrier during insertion of said barrier, said guiding and supporting means defining a tapered opening in a plane generally perpendicular to said barrier when said barrier is in said predetermined position, the plane of said tapered opening also being generally perpendicular to the direction of insertion of said barrier.

2. The barrier arrangement of claim 1 wherein said guidng and supporting means further defiens said tapered opening narrowing into a slot.

3. The barrier arrangement of claim 1 wherein said first means comprises a manually operable fastener.

4. The barrier arrangement of claim 1 wherein said guiding and supporting means additionally guides and supports said barrier during removal.

5. The barrier arrangement of claim 1 wherein said enclosure includes an access opening that defines the front of said enclosure, said cooperating means being arranged proximal said front of said enclosure and proximal the top of said enclosure.

6. The barrier arrangement of claim 5 wherein said first means is retained at a top front portion of said barrier, the front of said barrier being defined as being proximal said access opening when said barrier is in said predetermined position, the top of said barrier being defined with respect to the top of said enclosure.

7. The barrier arrangement of claim 1 wherein said enclosure includes an access opening, a front of said barrier being proximal said access opening when said barrier is in said predetermined position, said guiding and supporting means being located proximal the lower back portion of said barrier when said barrier is in said predetermined position.

8. The barrier arrangement of claim 7 wherein said first means is retained by said barrier at the upper front portion of said barrier, said cooperating means being located at the upper front portion of said enclosure.

9. The barrier arrangement of claim 1 wherein said enclosure includes an access opening, said enclosure defining a front adjacent said access opening, said barrier being inserted through said access opening, said guiding and supporting means comprising a first guide and support member carried toward the rear of said enclosure, and a second support member carried adjacent said front of said enclosure.

10. The barrier arrangement of claim 9 wherein said second support member is removable from said enclosure.

11. The barrier arrangement of claim 9 wherein said enclosure and said second support member include cooperating means for supporting said second support member against relative movement with respect to said enclosure except for allowing removal of said second support member by displacement of said second support member in a predetermined direction.

12. The barrier arrangement of claim 9 wherein said enclosure includes means for defining two or more planar portions each of which includes a slot, said second support member including a slot aligned with each of said slots of said enclosure.

13. The barrier arrangement of claim 1 wherein said first means comprises an elongated member defining an axial direction and having a widened head portion in a plane that includes the axial direction to facilitate manual rotation of said elongated member about said axial direction.

14. The barrier arrangement of claim 1 wherein said barrier includes an aperture and said first means includes an elongated member having a first end that extends through said aperture of said barrier, the second end of said elongated member including a widened head portion, said first means further including a retaining element affixed on said first end of said elongated member to retain said elongated member to said barrier.

15. A barrier system utilized with electrical apparatus that includes an enclosure, the barrier system comprising:
one or more barriers, each of said one or more barriers being a generally planar member and being fabricated from insulating material;
manually operable means for releasably securing said one or more barriers when said one or more barriers are in respective predetermined operating positions within said enclosure, said manually operable means comprising first means retained by each of said one or more barriers and second means cooperating with said first means and being retained by said enclosure; and
means for guiding and supporting said one or more barriers as each of said one or more barriers is inserted into or removed from said enclosure, said guiding and supporting means comprising means for engaging a predetermined edge portion of each of said one or more barriers when said predetermined edge portion is within a predetermined range of orientation with respect to said engaging means, said predetermined range of orientation being substantially larger than a range of movement permitted to each of said one or more barriers when each of said one or more barriers is in said respective predetermined operating position, said guiding and supporting means comprising a generally planar member that is arranged so as to be generally perpendicular to the direction of insertion and removal of said one or more barriers, said generally planar member defining a tapered opening for each of said one or more barriers.

16. The tapered opening of claim 15 wherein said cross section of said member further defines said tapered opening narrowing into a slot.

17. The barrier system of claim 15 wherein said enclosure includes an access opening, said second means being retained by said enclosure adjacent said access opening.

18. The barrier system of claim 15 wherein said first and second means comprise a manually operable fastener and a cooperating receptacle.

19. The barrier system of claim 18 wherein said first means is retained by said one or more barriers.

20. The barrier system of claim 15 wherein said first means comprises an elongated member having a widened head portion for grasping by the fingers.

21. The barrier system of claim 20 wherein said elongated member further includes a widened nose portion opposite said head portion that cooperates with said second means to selectively release or secure said barrier to said enclosure by selective rotation of said elongated member by a fractional revolution.

22. A removable barrier arrangement utilized with an enclosure for electrical apparatus, the barrier arrangement comprising:
a plurality of barriers, each of said barriers being generally planar and being fabricated from insulating material;
a manually operable fastener retained by each of said plurality of barriers;
cooperating means carried by said enclosure for cooperating with said manually operable fasteners to retain each of said plurality of barriers in a respective predetermined position when said respective manually operable fastener is aligned with said respective cooperating means and said manually operable fastener is operated in a predetermined manner; and
means carried by said enclosure for guiding and supporting each of said plurality of barriers during insertion of each of said plurality of barriers, said guiding and supporting means defining for each of said plurality of barriers a tapered opening in a plane generally perpendicular to the direction of insertion and removal of each of said plurality of barriers.

23. A removable barrier arrangement utilized with an enclosure for electrical apparatus, the barrier arrangement comprising:
a barrier being generally planar and being fabricated from insulating material;
manually operable means for releasably securing said barrier when said barrier is in a predetermined operating position within said enclosure, said manually operable means comprising first means retained by said barrier and second means cooperating with said first means and being retained by said enclosure; and
means carried by said enclosure for guiding and supporting a significant portion of said barrier during insertion of said barrier, said guiding and supporting means defining a tapered opening in a plane generally perpendicular to said barrier when said barrier is in said predetermined position.

24. A barrier system utilized with electrical apparatus that includes an enclosure, the barrier system comprising:
one or more barriers, each of said one or more barriers being a generally planar member and being fabricated from insulating material;
manually operable means for releasably securing said one or more barriers when said one or more barriers are in respective predetermined operating positions within said enclosure, said manually operable means comprising first means retained by each of said one or more barriers and second means cooperating with said first means and being retained by said enclosure; and means for guiding and supporting said one or more barriers as each of said one or more barriers is inserted into or removed from said enclosure, said guiding and supporting means comprising means for engaging a predetermined edge portion of each of said one or more barriers when said predetermined edge portion is within a predetermined range of orientation with respect to said engaging means, said predetermined range of orientation being substantially larger than a range of movement permitted to each of said one or more barriers when each of said one or more barriers is in said respective predetermined operating position, said guiding and supporting means including a member, said member having a cross section generally perpendicular to the plane of said one or more barriers that defines a tapered opening, said cross section that defines said tapered opening also being generally perpendicular to the direction of insertion and removal of said one or more barriers.

25. A removable barrier arrangement utilized with an enclosure for electrical apparatus, the barrier arrangment comprising:

first and second discrete barriers, each said barrier being generally planar and being fabricated from insulating material;

manually operable means associated with each said barrier, each said manually operable means for releasably securing its associated barrier when said associated barrier is in a predetermined operating position within said enclosure, and comprising first means retained by said associated barrier for securing said barrier and second means retained by said enclosure for cooperating with said first means, each said manually operable means being operable independent of the other said manually operable means for selective removal of its associated barrier; and means carried by said enclosure for guiding and supporting each said barrier during insertion of said barrier, said guiding and supporting means defining a tapered opening in a plane generally perpendicular to said barrier when said barrier is in said predetermined position, the plane of said tapered opening also being generally perpendicular to the direction of insertion of said barrier.

26. A barrier system utilized with electrical apparatus that includes an enclosure, the barrier system comprising:

at least two discrete barriers, each said barrier being a generally planar member and being fabricated from insulating material;

manually operable means associated with each said barrier for releasably securing said associated barrier when said associated barrier is in a predetermined operating position within said enclosure, said manually operable means comprising first means retained by its associated barrier for securing said barrier and second means retained by said enclosure for cooperating with said first means, each said manually operable means being operative independent of the other said manually operable means for selective removal of its associated barrier; and means for guiding and supporting said at least two barriers as each of said barriers is inserted into or removed from said enclosure, said guiding and supporting means comprising means for engaging a predetermined edge portion of each of said barriers when said predetermined edge portion is within a predetermined range of orientation with respect to said engaging means, said predetermined range of orientation being substantially larger than a range of movement permitted to each of said barriers when each of said barriers is in said respective predetermined operating position, said guiding and supporting means including a member, said member having a cross section generally perpendicular to the plane of each of said barriers that defines a tapered opening, said cross section also being generally perpendicular to the direction of insertion and removal of each of said barriers.

27. A removable barrier arrangement utilized with an enclosure for electrical apparatus, the barrier arrangement comprising:

a barrier being generally planar and being fabricated from insulating material;

manually operable means for releasably securing said barrier when said barrier is in a predetermined operating position within said enclosure, said manually operable means comprising first means retained by said barrier and second means cooperating with said first means and being retained by said enclosure; and means carried by said enclosure for guiding and supporting said barrier during insertion of said barrier, said guiding and supporting means defining a tapered opening so as to support a significant portion of the weight of said barrier during insertion.

* * * * *

UNITED STATES PATENT AND TRADEMARK OFFICE
CERTIFICATE OF CORRECTION

PATENT NO. : 4,791,530
DATED : December 13, 1988
INVENTOR(S) : Arvydas J. Kalvaitis, et al It is certified that error appears in the above—identified patent and that said Letters Patent is hereby corrected as shown below:

Page 1, Abstract, line 18, delete "is" (second occurrence);

Col. 3, line 23, delete "is" (second occurrence);

Col. 5, line 8, "1/2" should be -- 1/9 --;

Col. 7, line 43, "42" (first occurrence) should be -- 40 --;

Col. 7, line 58, after "retained" insert -- by the enclosure and the cooperating structure 48 such as receptacle 76 is retained --;

Col. 8, claim 2, line 2, "defiens" should be -- defines --.

Signed and Sealed this

Ninth Day of May, 1989

Attest:

DONALD J. QUIGG

Attesting Officer

Commissioner of Patents and Trademarks